April 14, 1964  L. STEINBRECHER ETAL  3,129,148
METHOD AND APPARATUS FOR MEASURING FLUORIDE ACTIVITY
Filed Nov. 8, 1962  7 Sheets-Sheet 1

INVENTORS
Lester Steinbrecher
David Y. Dollman
Dwight E. Buczkowski
James W. Harrison
BY Synnestvedt & Lechner
ATTORNEYS April 14, 1964    L. STEINBRECHER ETAL    3,129,148
METHOD AND APPARATUS FOR MEASURING FLUORIDE ACTIVITY
Filed Nov. 8, 1962    7 Sheets-Sheet 2

INVENTORS
Lester Steinbrecher
David Y. Dollman
Dwight E. Buczkowski
James W. Harrison
BY Synnestvedt & Lechner
ATTORNEYS

United States Patent Office 3,129,148
Patented Apr. 14, 1964

3,129,148
METHOD AND APPARATUS FOR MEASURING
FLUORIDE ACTIVITY
Lester Steinbrecher, Philadelphia, David Y. Dollman, Lansdale, Dwight E. Buczkowski, Ambler, and James W. Harrison, Philadelphia, Pa., assignors to Amchem Products, Inc., Ambler, Pa., a corporation of Delaware
Filed Nov. 8, 1962, Ser. No. 236,266
12 Claims. (Cl. 204—1)

This invention relates to a method and apparatus for measuring fluoride activity in acidic aqueous solutions. In addition, the method and apparatus provide means for controlling fluoride activity in the measured solution.

The terms "fluoride activity," "activity," and "active fluoride" are used herein to designate a property exhibited by fluoride when it is present in acidic aqueous solutions, or, stated another way, a property of the fluoride containing solution itself. For present purposes, the activity of the fluoride may be taken as its ability to cause a solution containing it to etch a piece of lime soda glass. Fluoride activity is an important property of many industrially important fluoride containing solutions. One class of such solutions which will be discussed briefly below are those used to form protective coatings on metals.

The actual form taken by the fluoride which enables it to exhibit fluoride activity as herein defined is not known. It is known, however, that fluoride activity is not a measure of the total amount of fluoride present in the solution in all forms. It is also known that certain complexes containing fluoride and certain unionized fluoride salts, such as aluminum fluoride, do not appear to contribute materially to the activity of an acidic solution. Furthermore, fluoride ion in neutral solutions does not appear to exhibit activity.

For these reasons, no attempt will be made here to construct a theoretical model of the mechanism by which fluoride activity is created. For the purposes of presenting the results obtained in the present invention in quantitative form, the viewpoint has been taken here that the activity is caused by fluoride ions. Thus the quantitative results will be expressed in terms of gram-ions of fluoride ion per liter. This form of expression is used merely for convenience and is not intended to express a position concerning the cause of fluoride activity, since this is in fact unknown.

The method and apparatus have their primary utility in measurements made on acidic systems, since these are the systems in which, according to present experience, fluoride activity is present.

The invention is useful in monitoring fluoride activity in various types of solutions in which wide variety of other anions are present. Heretofore reliable measurements of fluoride activity have been inherently difficult to obtain because many analytical methods are unable to differentiate between fluoride activity and the total fluoride content. Total fluoride concentration is a relatively less important property than activity, since it is the activity of the solution which determines its degree of utility for many purposes.

U.S. Patent 2,814,577 discloses one analytical scheme which does have the ability to segregate the fluoride activity from the total fluoride content in a solution. The method taught by this patent involves a measurement of the ability of the solution to etch ordinary glass. While it is extremely useful, the procedure is time consuming and somewhat tedious. In addition, equipment such as an analytical balance is necessary to quantitize the results obtained. The present invention provides equipment for readily and accurately measuring fluoride activity in a very simple manner.

One field in which fluoride containing solutions are used extensively is in the art of producing corrosion resistant and decorative coatings on metals. The following U.S. patents illustrate processes employing aqueous solutions of fluoride for treating a variety of metals including aluminum, iron, steel, etc.: 2,438,877, 2,472,864, 2,678,291, 2,814,577, 2,909,455, 2,936,254, 2,796,370, 2,851,385, 3,009,842, 2,114,151, 2,507,956. In the solutions of these processes the principal and essential ingredients are usually fluorides and hexavalent chromium. In certain of the processes additional material, such as phosphate, arsenates and complex cyanides are also present in the treating solutions.

In the operation of metal treating processes, it is quite important to maintain the concentrations of the coating producing ingredients at substantially constant values as successive metal products are treated, in order to obtain a uniform quality of coating from product to product. Because of the inherent difficulty of measurement of fluoride activity and hence difficulty in controlling that ion, it has not been easy to achieve the desired high degree of uniformity of product. The method and apparatus of this invention have proved quite useful in overcoming this problem and they will be discussed herein principally in the context of equipment especially tailored for use in the metal treating industry. However, it should be understood that the method and apparatus are of utility in a wide variety of other applications.

According to the invention, fluoride activity is measured by placing the solution in an electrolytic cell having two electrodes, one of which is composed of n-type silicon. A voltage is placed across the electrodes and the current passing through the solution is measured. During the measurement, the silicon electrode in the cell is exposed to light which is substantially constant in intensity and spectral distribution. It has been found that over a substantial range of fluoride activity, the current passing through the cell is essentially directly proportional to the fluoride activity. This relation has been found to hold even though other anions are present in the solution and even though the pH of the solution varies.

It is an object of this invention to provide a method and apparatus for rapid and reliable measurement of fluoride activity in acidic solutions.

It is another object of this invention to provide a method and apparatus for monitoring and controlling the fluoride activity of acidic solutions.

A further object of the invention is the provision of a method and apparatus for monitoring fluoride activity in solutions containing other ingredients, for example, solutions such as those used in the metal treating art.

The above objects and purposes together with others may be more readily understood by a consideration of the detailed description which follows, together with the accompanying drawings in which.

Figure 1:
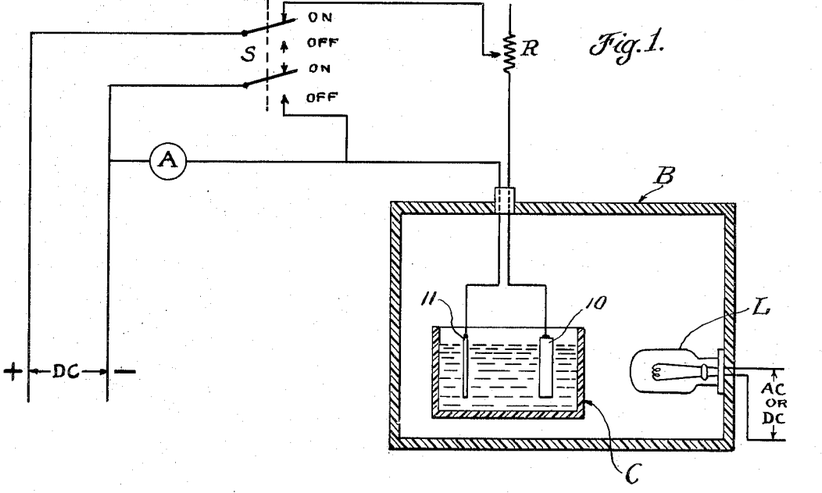
FIGURE 1 is a diagrammatic illustration of certain aspects of the invention.

An over-all understanding of the invention may be had by referring to the diagrammatic illustration of FIGURE 1. In this figure it can be seen that there is provided a cell C adapted to contain a sample of the solution which is being analyzed. The cell is positioned within a light tight housing B which substantially surrounds it to exclude all extraneous light. Mounted within the housing is an artificial source of light, for example, the incandescent bulb L.

The cell is provided with a pair of electrodes. The electrode marked 10 is an n-type silicon electrode, while the electrode marked 11 is of an inert material, for example, platinum. As can be seen on the drawing, wiring is provided to connect the silicon electrode to the positive side of a D.C. voltage source, and the inert electrode to the negative side of that source. An ammeter marked A on FIGURE 1 is placed in series with the cell. While it is shown on the negative side of the cell in the drawing, this is merely for convenience and the meter may in fact be positioned on either side. A switch S is employed to connect the power source to the cell. The variable resistor R is placed in the circuit so that the voltage placed across the cell may be adjusted by the operator. Power is also supplied to the light source within the housing.

The currents developed in the course of measurements of fluoride solutions will ordinarily be of the order of several hundred microamperes, and the ammeter should have a suitable sensitivity in this current range.

The power supply should be adequate to provide about 2 volts and a standard mercury cell battery supplying about 1.35 volts steady state has been found to be quite satisfactory. If desired, such cells may be mounted in series to increase the available voltage and in parallel to increase the available current. In addition, for certain applications, standard dry cell batteries may be used.

The general operation of the invention, with reference to FIGURE 1, is as follows. The solution to be measured is placed in the cell, and care is taken to insure that the silicon electrode 10 is exposed to the light source L, and that other light is excluded. A voltage is placed across the cell and the current in the cell is measured by means of the ammeter A.

On closing the circuit and turning on the light, the micro ammeter will read a rather large current which rapidly falls so that within a short period, e.g., two to five minutes, a nearly steady reading is obtained. Whenever a current measurement is referred to herein, it will be understood that reference is made to this steady reading. Unless otherwise stated, the values given refer to unstirred solutions.

It has been found that the current reading on the ammeter is related to the degree of fluoride activity in the sample when expressed as fluoride ion concentration. For precision work, accurate calibration curves can be developed to express this relation for the particular measuring equipment in the particular type of system which is being measured. However, for technical work, it has been found that the cell current may be regarded as substantially linearly related to the degree of fluoride activity over an appreciable range including the range of activity shown by many industrially important fluoride solutions.

The presence of other anions in the solution has only a slight effect on the current-activity relationship. Once again, precise calibration curves can be constructed for a particular system having in it other known anions. For ordinary technical measurements, however, readings with satisfactory accuracy and reliability may be obtained by ignoring the minor effect of other anions.

For a given cell voltage, the slope of the curve defining the current-fluoride activity relationship varies with the quantity of light falling on the silicon electrode. (As will be discussed in detail later, there appears to be a threshold level of activity below which the quantity of light has little effect on the relationship.) For a given quantity of light the slope of the curve establishing the relationship varies with the voltage. An absolute increase in the magnitude of the cell current may be obtained by increasing the area of the silicon electrode which is exposed to the light. It has also been noted that the slope of the curve may be modified by stirring the solution which is being measured. By adjusting these parameters it is possible to maximize the performance of a given cell to meet the particular analytical conditions encountered. The parameters of voltage and light quantity are particularly susceptible to adjustment.

Before discussion the various preferred embodiments illustrated in FIGURES 2 through 5, there will be discussed the considerations involved in the operation of the method and the design of the apparatus of the invention, and the excellent results obtained according to the invention. For these purposes reference is made to FIGURES 6 through 10. The data represented on these figures were gathered by means of several instruments embodying the invention, which are discussed in detail later herein.

It is known that measurements can be made on solutions containing concentrated nitric acid and hydrofluoric acid, which etch silicon, by placing in the solution an n-type silicon electrode and a platinum electrode, and placing a voltage thereacross while keeping the cell in darkness. The worker reporting this development was of the opinion that the measurements so obtained were of fluoride ion concentration.

According to the known method, if it is desired to measure fluoride concentration in solutions other than concentrated nitric acid, it is necessary to mix a sample of that solution with a quantity of concentrated nitric acid. The measurement is then made on the mixed solution, and the fluoride concentration in the sample is obtained by computation from the raw measurement. If other ions are present which reduce the rate of etching caused by the solution, further manipulations are required to obtain the fluoride concentration. In any event, the known method depends upon the presence of a concentrated nitric acid solution in the sample cell. It also requires that the measurements be made in darkness. For a discussion of this method see the Scientific Communication by Turner in Analytical Chemistry, volume 33, No. 7, June 1961, pages 959 and 960. See also the article by Turner in the Journal of the Electro Chemical Society, June 1961, pages 561 to 563.

The present method and apparatus do not rely on the presence of concentrated nitric acid in the sample cell, nor do they rely on measuring conditions including complete darkness. On the contrary, the use of a constant source of light visible to the silicon electrode forms an important feature of this invention. This development represents an improvement over the known method in several important respects. For example, increased sensitivity is obtained and measurements may be made on solutions containing only a small amount of fluoride. While the exact mechanism by which the invention operates is not completely understood, and there is no intention to be limited by any theoretical model of the operation, it may be observed that the incidence of light on the surface of the silicon electrode is thought to cause a material increase in the number of positive "holes" at the surface of the electrode. The increase thus brought about is thought to permit the dissolution of silicon at a sufficiently rapid rate that a measurement of the corrosion current can be made.

Figure 6:
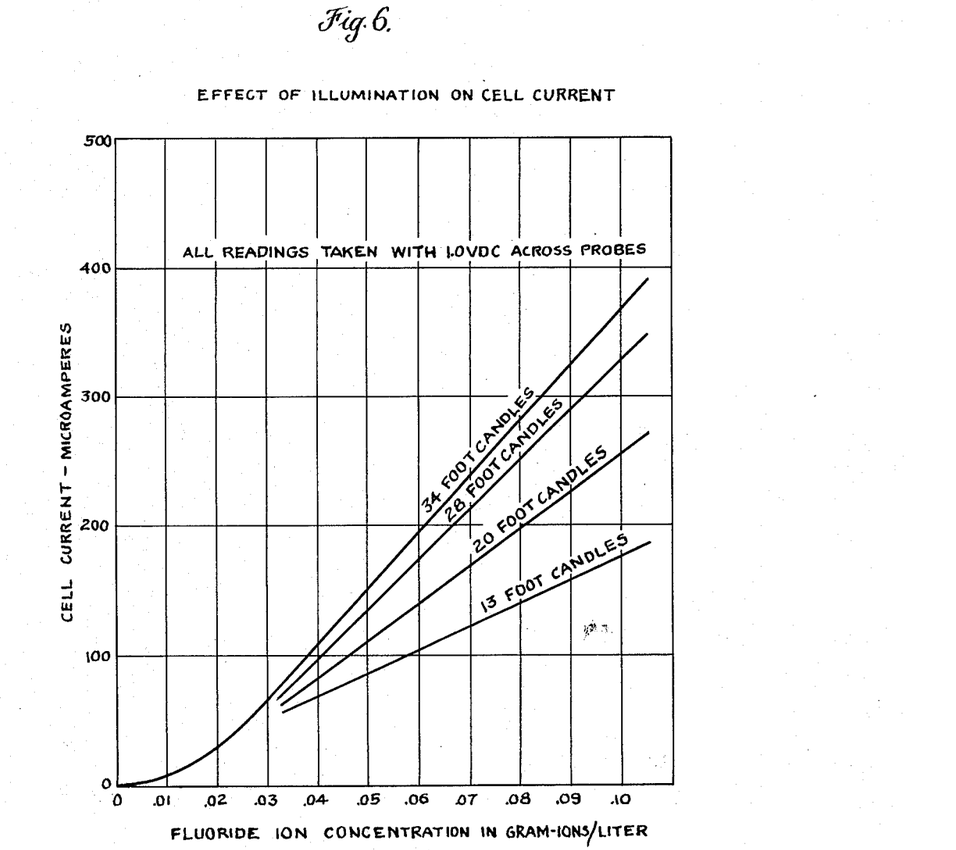
FIGURE 6 is a graph, demonstrating the effect of illumination on the measurements according to the method of the invention.

FIGURE 6 illustrates the effect of the quantity of light on the cell current-fluoride activity relationship. The quantities of light indicated on the graph of FIGURE 6 are approximate measurements. They were obtained by placing a light meter in the position normally occupied by the silicon electrode in the cell illustrated in FIGURE 2. The numerical value for the foot-candles so obtained represents the light meter readings when the meter is in the same position as that occupied by the base of the electrode. The total quantity of light incident on the meter (and the electrode) consists of light coming directly from the source, and light which is reflected once or more from the inside walls of the light tight housing. This quantity of light may readily be reproduced by constructing a cell according to the detailed description of the instrument of FIGURE 2 which is given hereinbelow. The various illuminations indicated on FIGURE 6 were obtained by varying the brightness of the light L of FIGURE 2.

With this understanding of the meaning of the foot-candle quantities given in FIGURE 6, it can be seen that for the range of illumination plotted on that figure, an increase in the illumination causes an increase in the slope of the curve defining the current-activity relationship when the voltage is held constant. It may also be noted that the curves developed on FIGURE 6 are approximately straight lines.

It has been found that the general effect of illumination on the curve is the same when the illumination is increased to quantities much greater than those shown on FIGURE 6. However, the quantitative effect of greatly increased illumination differs from the effect noted by moderate changes in the illumination as plotted on FIGURE 6. In particular, it appears that below about .06 gram ion per liter of fluoride a large increase in the quantity of light, for example to the neighborhood of 100 to 1000 foot-candles, does not substantially modify the curve established when there is a much lower level of light, for example about 34 foot-candles. Above about 0.06 gram ion per liter of fluoride, the effect of large increases in the illumination does have a material effect on the slope of the current-activity curve. In summary, it appears that for moderate quantities of light there exists a family of curves generally converging toward the origin, and for large quantities of light there exists a family of curves which are substantially the same curve from the origin to about 0.06 gram ion per liter and which fan outwardly and upwardly on a plot such as FIGURE 6 for concentrations about the mentioned level.

In order to maintain the relationship, it is important to have the same spectral distribution in the light from measurement to measurement. That it to say, the spectral distribution along each of the lines of FIGURE 6 is held substantially constant. It should be remembered that the spectral distribution of the light developed by an incandescent bulb such as the light source L in FIGURE 2 varies with the temperature of the bulb filament. Aside from the importance of maintaining the wave length composition of the light constant, there is no serious criticality in the spectral distribution. The operative range of wave lengths extends from about 1.2 microns, through the visible spectrum, and into the ultraviolet spectrums. The light created by ordinary incandescent light bulbs has proved very satisfactory for the operation of this invention.

For measurements on solutions containing from about 0 to about 0.15 gram ion per liter of fluoride ion, it is preferred to use about 25 foot-candles of light developed by an incandescent bulb, using the term foot-candle in the sense discussed above. Light ranges of from about 10 to about 1000 foot-candles give satisfactory results under a variety of conditions, but quantities of light below about 7 foot-candles give only marginal results.

Figure 7:
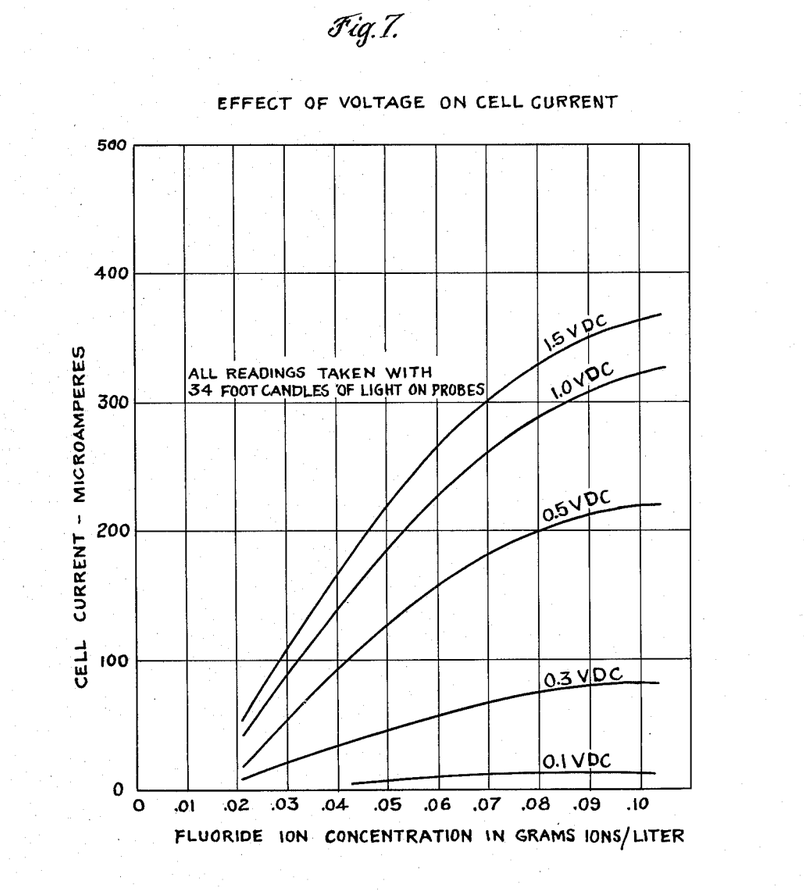
FIGURE 7 is a graph illustrating the effect of voltage on the measurements according to the invention.

FIGURE 7 illustrates the effect of voltage on the current-concentration relationship, when the quantity of the light is held substantially constant. Again, the data represented in this figure were gathered on an instrument like that illustrated in FIGURE 2 herein. From this figure it can be seen that although the relationship remains substantially a straight line, at various voltages between 0.1 volt and about 2.5 volts, the line has a different slope for each voltage. It is preferred to use a voltage of about 0.6 volt when measuring solutions containing from 0 to about 0.15 gram ion per liter of fluoride ion. Lower voltages result in lower sensitivity. Higher voltages, while operative, accelerate the formation of a film on the electrodes. This film interferes in varying degrees with the measurement. At the preferred voltage the film presents only a minor problem since it is easily removed by chemically etching the electrodes, and further, it does not form at an excessive rate. A suitable cleaning solution for the electrodes is 50 ml. of concentrated nitric acid plus 30 ml. of 49 percent hydrofluoric acid plus 30 ml. of glacial acetic acid.

While voltages above about 1.5 volts D.C. and in the range from about 1.5 to about 2.5 volts D.C. are operative, it has been noted that the slope of the curve for such higher voltages is actually less than the slope for the 1.5 volt level. Therefore, in the absence of other circumstances, such higher voltages are not ordinarily preferred.

It may also be pointed out here that for any given voltage there is a very slight drift at the outset of the measuring step, but that the current readings quickly assume a steady state value. Factors which are not completely understood cause this drift. There is no substantial problem either with the initial drift or with cell polarization which is sometimes encountered in electrochemical apparatus.

For the same reasons as those discussed in connection with the light quantity, it is important to maintain the voltage substantially constant from measurement to measurement, since variations in the voltage will cause deviations from the desired relationship between current and activity.

Figure 8:
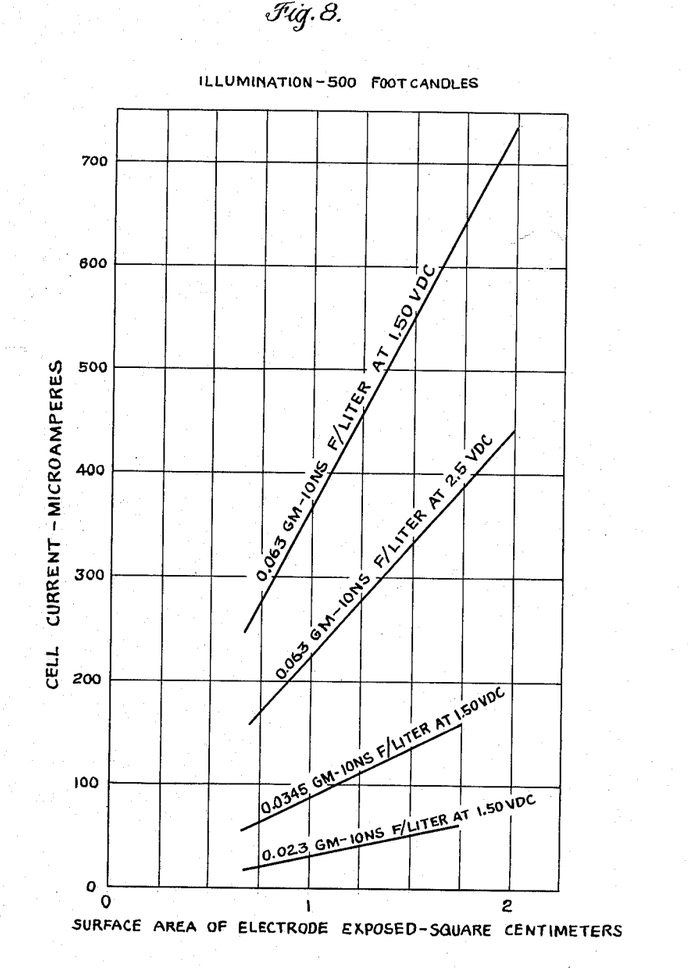
FIGURE 8 is a graph showing the relationship between the cell current and the exposed surface area of the silicon electrode.

FIGURE 8 illustrates the effect of the silicon electrode area which is exposed to light on the absolute value of the cell current. From this figure it can be seen that while no change in the slope in the current-activity curve is obtained, it is possible to increase the magnitude of the current by increasing the surface area of the electrode. This technique is useful when measurements are being made on very dilute solutions. When a larger silicon electrode is utilized, one should be careful to see that the entire surface of the electrode is exposed to the light because otherwise the advantage gained by increasing the electrode surface will be lost.

In order to assure reliability of measurements according to the invention, some care should be taken to make the measurements at substantially constant temperature. For most technical work on industrial solutions, measurements made at normal room temperatures will be sufficiently reliable and comparable with each other, if the temperature of the samples does not vary more than about 5° F. For very precise work it may be desirable to mount the measuring apparatus in a constant temperature bath, and to take special precautions to prevent the light source from unduly heating the sample. Refinements of this sort will readily occur to those skilled in the art.

The sample being measured may be stirred or unstirred, but the straight line relationship will be different for each condition. For most work it is desirable to use unstirred samples. However, in apparatus such as that illustrated in FIGURE 3 which is arranged for a continuous flow of sample through it, there is, of course, agitation to some degree in the sample. In order to insure the desired level of reliability of measurements when agitated or stirred samples are used, care should be taken to provide uniform agitation, by means of constant flow rates in continuous type devices, and by use of constant stirrer speed in batch type apparatus. Extremely violent agitation should be avoided, because it may disrupt the movement of ions carrying the current in the solution.

Figure 9:
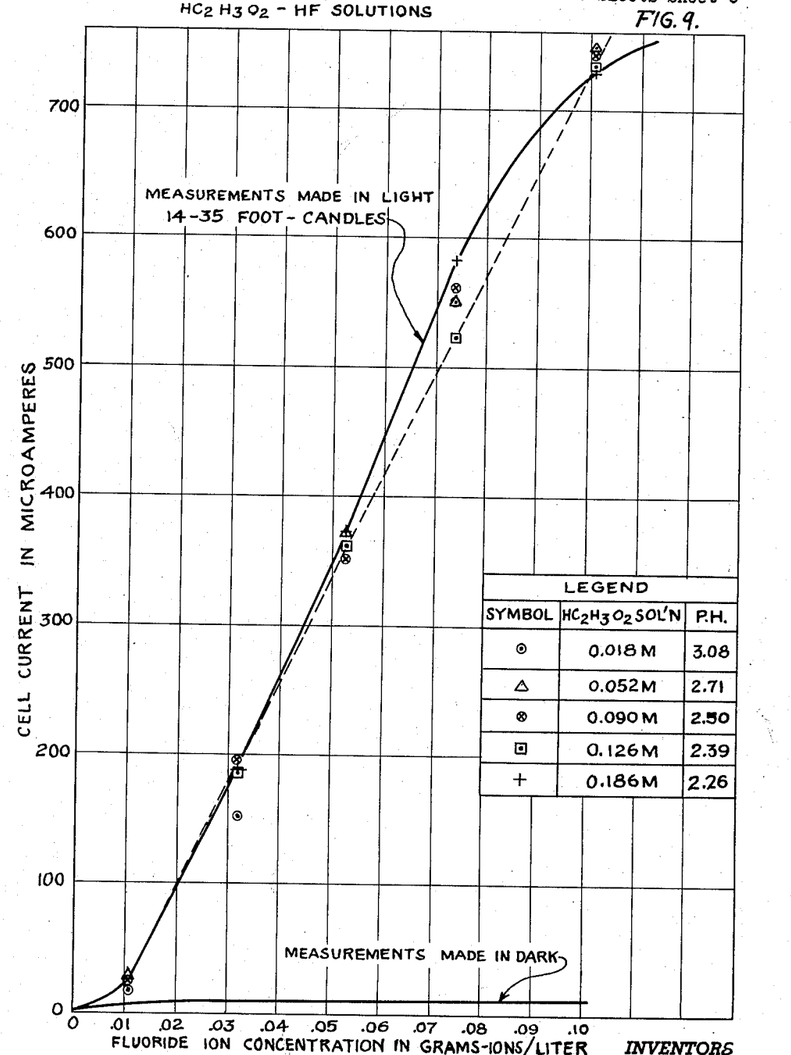
FIGURE 9 is a graph showing the relation between the measured current and the fluoride activity in several solutions in which the concentration of another anion is varied.
Figure 10:
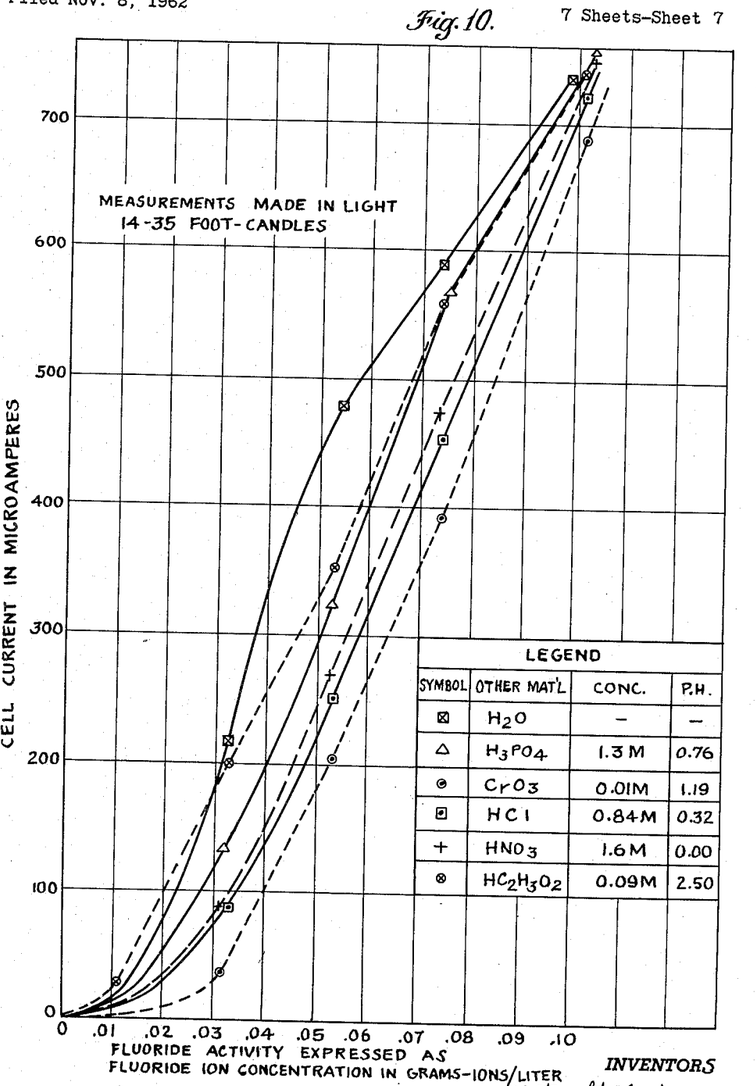
FIGURE 10 is a graph illustrating the relation between fluoride activity and cell current in the presence of a variety of other anions.

FIGURES 9 and 10 demonstrate the excellent results obtained by use of the invention. The data represented on these graphs were gathered by use of an instrument such as that illustrated in FIGURE 4 and described in full detail later.

FIGURE 9 shows the results of a series of measurements of fluoride ion concentration in solutions having various concentrations of acetic acid. From this figure it can be clearly seen that the presence of the acetic acid in the solution has only a very slight effect on the relationship between cell current and fluoride. For high precision work, calibration curves similar to FIGURE 9 can be worked up for the particular systems involved. The effect of the additional anion is slight enough that for technical work the apparatus and method can be regarded as substantially insensitive to the presence of, and the concentration of, material other than fluoride. Other experiments have yielded substantially the same result for other materials providing other anions in solutions. Among these materials are hydrochloric acid, chromic acid, phosphoric acid, and nitric acid.

FIGURE 10 presents experimental results which show clearly the fact that the method and apparatus are selective of the fluoride activity, even though other anions are present. On this figure there are plotted results obtained by measuring fluoride concentration in samples containing the following additional materials: hydrochloric acid, chromic acid, phosphoric acid, and nitric acid. The graph shows that substantially the same relationship between cell current and fluoride ion concentration exists despite the varying natures of the added materials.

The legends on FIGURES 9 and 10 give the various concentrations and pH's of the experimental solutions. In all the cases the applied voltage was 1.56 volts, the resistivity of the silicon electrode was 0.7 ohm-cm., the area of the silicon electrode was approximately 1 sq. cm., and the solutions were not stirred. The cathode in all cases was platinum. The quantity of light falling on the silicon electrode, as measured by a light meter placed in the position of the electrode was from 14 to 35 foot-candles, depending on the angle at which the light struck the electrode. That is to say, different portions of the electrode were exposed to different illuminations, varying from 14 to 35 foot-candles in intensity. The total quantity of light falling on the electrode may readily be reproduced by consructing an instrument like FIGURE 4, according to the instructions found hereinbelow.

In FIGURE 9 there is also plotted a line illustrating the results obtained when the measurement is made in complete darkness.

Figure 2:
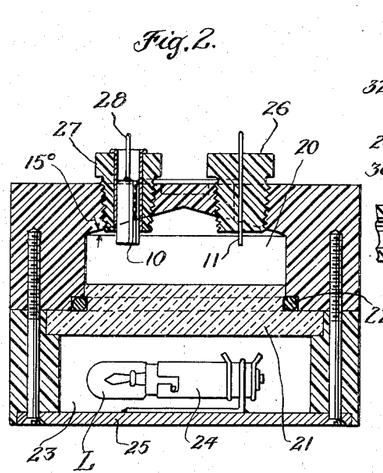
FIGURE 2 is a cross sectional elevation of a measuring cell constructed according to the invention.

FIGURE 2 illustrates a portable instrument constructed according to the invention. It may conveniently be constructed of polyvinyl chloride plastic, which is resistant to attack by fluoride. The dimensions of this cell will be given in some detail to enable those skilled in the art to reproduce the instrument by means of which the data on FIGURES 6 and 7 were obtained. The over-all dimensions of the cell are about 3½" in diameter and 2⅜" in height. The sample compartment 20 is 2" in diameter, with walls ½" high and has a conical roof forming an angle of 15° with the horizontal. A sample pouring hole 1" in diameter is bored through the roof behind the electrodes 10 and 11, in FIGURE 2, and a stainless steel lid is provided therefor. The floor 21 of the sample compartment is formed of a clear material which is not attacked by fluoride ion such as polymethylmethacrylate. This floor is about ½" thick. It may conveniently be made with a flange designed to fit into a groove in the light housing of the unit and a leak-proof mounting is obtained by use of the O-ring seal 22 which sits in a groove provided in the sample compartment wall.

The light compartment 23, as can be seen in the figure, is positioned immediately below the sample compartment. It is about 2½" in diameter and ¾" high. The light fixture 24 is mounted on the steel floor 25 of the compartment. The floor and the inside walls of the light compartment are painted white in order to increase their reflectivity. The light source L is a 2.5 volt at ½ amp. bulb such as G.E. No. 43, of standard design.

The electrodes may be mounted in any convenient fashion, but the following construction has been found to be very satisfactory. The inert electrode is a platinum wire which is drawn through a fine hole in the plastic bolt 26 which is in turn threaded into a hole in the roof of the sample compartment. The n-type silicon electrode is desirably cylindrical in shape. A piece of polyvinyl chloride tubing can readily be heat shrunk onto the cylindrical electrode, leaving the desired area protruding beyond the end of the tubing. The tubing is cemented in a hole bored in the plastic bolt 27 which is threaded into a second hole in the roof of the sample compartment. A lead wire 28 is fastened or secured to the silicon electrode by well-known techniques.

Figure 3:
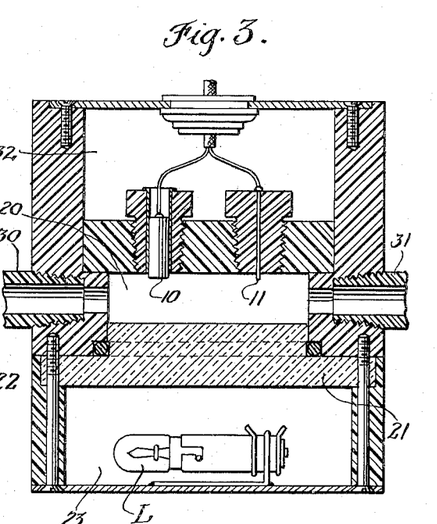
FIGURE 3 is a cross sectional elevation of another cell employing the invention, which is adapted to monitor fluoride activity in a solution passing continuously through the cell.

The embodiment of FIGURE 3 is a measuring cell which is similar in construction to that of FIGURE 2. This cell is arranged to measure a sample which is continually flowing through it. The construction is modified by eliminating the conical roof of the sample compartment and the sample pouring hole, and by providing a sample inlet 30 and an outlet 31. The bolts holding the electrodes and the lead wires may desirably be further protected by positioning them in a well 32 above the sample compartment 20. The light source in this embodiment is again positioned beneath the polymethylmethacrylate floor 21 of the sample compartment in the light compartment 23. The light source is the same in construction and placement as that of FIGURE 2. Once again, the inside of the light compartment 23 is painted white to increase its reflectivity.

Figure 4:
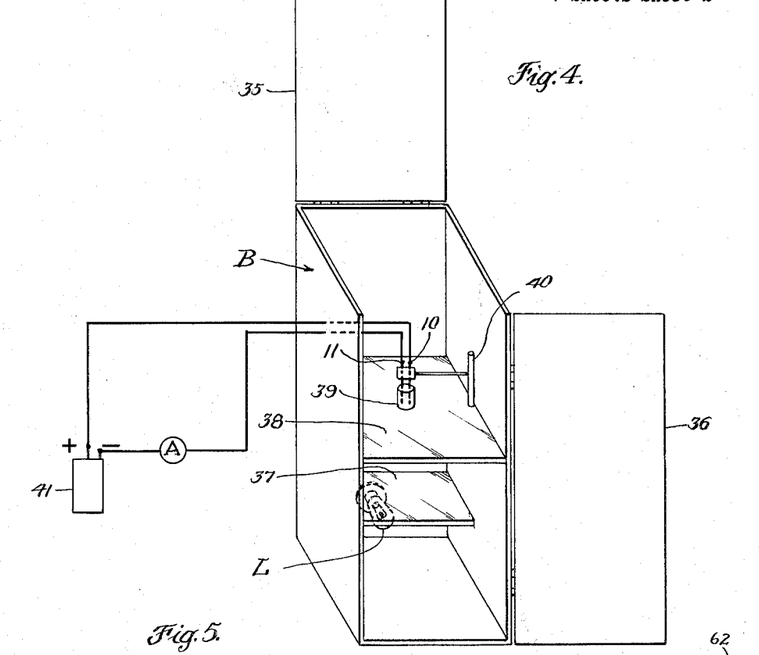
FIGURE 4 is a perspective view of another embodiment of the invention.

Another embodiment of the invention is shown in FIGURE 4. As can be seen from that figure the light tight housing B consists of a generally rectangular box having a hinged lid 35 and a hinged door 36. The interior of the housing is painted white to increase its reflectivity. On the back wall of the housing near the bottom is mounted the light housing L which in this case is a 15 watt frosted light bulb. Positioned above the light source is a frosted glass shelf 37 approximately ¼" thick, which extends from the back of the housing approximately one-half the distance toward the front. A second frosted glass shelf 38 extending from the back to the front of the housing is also provided. The sample cell is a 30 milliliter beaker positioned centrally on this shelf as shown at 39. Support means 40 are also mounted on the shelf 38 to support the electrodes 10 and 11. A battery 41 is located outside of the housing B and wires passing through the housing connect it to the electrodes. An ammeter is inserted into the circuit.

The preferred dimensions of this embodiment will be given in some detail to enable those skilled in the art to recreate the light conditions under which the data for FIGURES 9 and 10 were gathered. The housing is about 6" wide, 8" deep and 13" high. The frosted glass shelf 38 upon which the cell 39 is placed, is positioned about 7" from the bottom of the housing. The lower shelf 37 is positioned about 4½" from the bottom of the housing. The light bulb is an ordinary 15 watt 120 volt frosted glass bulb, and is mounted about 3¼" (to center of bulb) above the bottom of the housing.

Figure 5:
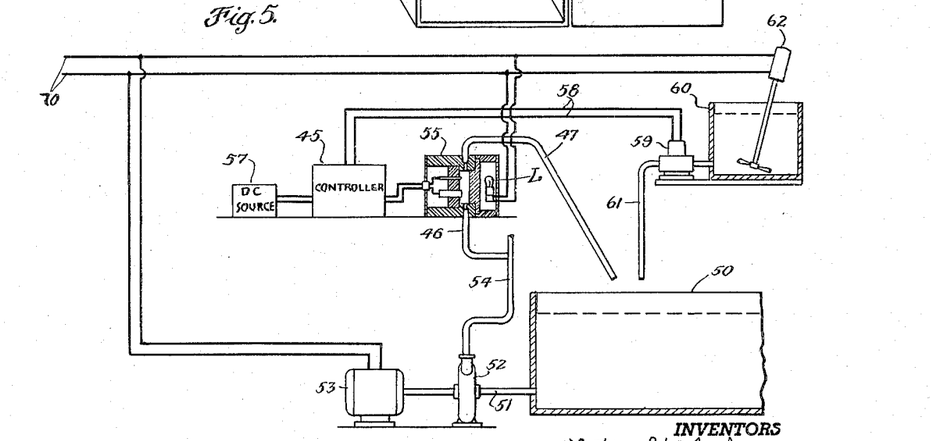
FIGURE 5 is a diagrammatic illustration of an embodiment which is adapted to continuously record or control fluoride activity in a solution.

In FIGURE 5 an embodiment is shown which utilizes a sample cell and light source like that of FIGURE 3. In FIGURE 5 such a cell is shown very diagrammatically at 55 where it is shown on a greatly enlarged scale as compared with the rest of the apparatus shown in that figure. The embodiment of FIGURE 5 provides a control system for a metal treating system utilizing fluoride-containing solutions. Only so much of the metal treating equipment is shown as is necessary for an understanding of the present invention.

The working solution is contained in a tank 50. It is withdrawn from the tank through the line 51 by means of the pump 52 which is driven by the motor 53. The solution is pumped through the riser 54 to spray heads (which are not shown) where the solution is sprayed onto a metal surface and ultimately falls back into the tank 50. A portion of the solution moving through the riser 54 is tapped off through the line 46 to the cell 55. After flowing through the cell, the solution is returned to the tank 50 through the line 47. A D.C. source indicated at 57 supplies the voltage for the cell through the controller 45. The current developed in the D.C. circuit, as discussed above, is detected in the controller which generates a signal through the lines 58 to operate a solenoid controlled valve 59.

The valve 59 is located in the outlet line 61 of a replenishing tank 60 which contains fresh make-up or replenishing solution. The tank 60 may desirably be provided with an agitator 62 for blending the make-up chemicals.

A.C. current is provided at 70 to operate the pump 53, the light bulb of the measuring cell 55, and the agitator 62.

When the cell current detected by the controller indicates that the fluoride activity of the solution is below the desired level, the controller moves the valve 59 to the on or open position to allow make-up solution to flow into the tank 50. When the current reaches the level corresponding to the desired fluoride activity, the controller moves the valve 59 to the off or closed position. In this way the analyzer provided by this invention continuously monitors and controls the level of fluoride activity in the metal treating system.

By way of summary, certain preferences in construction and operation of the method and apparatus may be pointed out. The silicon electrode is preferably an n-type single crystal. The surface of this electrode which is presented to the solution may be of any convenient size, but very satisfactory operation is obtained when about 1 sq. centimeter is used. The electrodes may be placed at any convenient distance. The inert electrode may be of any material which does not appreciably react with the solutions being tested, and platinum meets this requirement very well. The voltages placed across the cell may vary from about 0.3 volt to about 2.5 volts, with the preferred potential being about 0.6 volt. It is preferred to use light of an amount falling between about 7 foot-candles and about 1000 foot-candles. Excellent results are obtained with approximately 25 foot-candles of illumination. The considerations upon which the foregoing preferences are based have been discussed above. The method and equipment when so arranged will measure fluoride activity in the range from about 0 gram ion per liter to about 0.15 gram ion per liter. More concentrated solutions may easily be measured by diluting the sample with a known amount of water to lower the concentration to within the range of the equipment.

It can be seen that the method and apparatus of this invention provide the art with a versatile and reliable means for measuring and controlling the fluoride activity of aqueous acid solutions.

We claim:

1. Apparatus for measuring the level of fluoride activity in a solution comprising a cell adapted to contain a sample of said solution, a housing surrounding said cell for shielding the cell from extraneous light, an n-type silicon electrode positioned in said cell, an inert electrode positioned in said cell, means for placing a D.C. voltage across said electrodes with the positive side of the voltage at the silicon electrode, means for measuring the current passing between said electrodes when said voltage is placed across them, a source of light positioned within said housing to shine light upon the silicon electrode, said light source being adapted to develop a light of substantially constant luminous intensity and spectral distribution.

2. Apparatus for measuring the level of fluoride activity in a solution, in the range of from about 0.0 gram ion per liter to about 0.5 gram ion per liter of active fluoride, expressed as fluoride ion, comprising a cell adapted to contain a sample of said solution, an n-type silicon anode positioned in said cell, an inert cathode positioned in said cell, means for placing a voltage of from about 0.6 volt to about 2.5 volts across said anode and cathode, means for measuring the current passing betwen said anode and cathode when said voltage is placed across them, and means for subjecting said silicon electrode to from about 7 to about 1000 foot-candles of light of substantially constant luminous intensity and spectral distribution.

3. An electrochemical device comprising a cell adapted to contain a solution having a fluoride constituent therein, an n-type silicon electrode positioned in said cell to present a surface to said solution, an inert electrode positioned in said cell to present a surface to said solution, a source of light adjacent said cell constructed and arranged to supply a constant illumination with a constant spectral distribution to said surface of the silicon electrode presented to said solution, and a housing surrounding said cell positioned to exclude substantially all light therefrom except light from said light source.

4. Apparatus for measuring the level of fluoride activity in a solution comprising a cell adapted to contain a sample of said solution, an n-type silicon anode positioned in said cell, an inert cathode positioned in said cell, means for placing a voltage across said anode and cathode, means for measuring the current passing between said anode and cathode when said voltage is placed across them, and means for subjecting said silicon anode to light of constant value.

5. Apparatus for measuring the level of fluoride activity in a solution comprising a cell adapted to contain a sample of said solution, said cell being provided with a transparent wall, a source of light positioned outside said cell adjacent the transparent wall thereof, said source developing light of constant intensity and spectral distribution, a light shield surrounding said cell and said light source to exclude from said cell substantially all light developed by sources other than said source within the shield, an n-type silicon anode positioned in said cell with a surface presented toward said source of light, an inert cathode positioned in said cell, means for establishing a voltage across said anode and cathode, and a current measuring device placed electrically in series with said anode and cathode.

6. Apparatus according to claim 5 wherein said cell is provided with an opaque wall, and wherein said opaque wall forms a portion of said shield.

7. Apparatus for measuring the level of fluoride activity in a solution comprising a cell adapted to contain a sample of said solution, an n-type silicon anode positioned in said cell presenting a surface of about 1.0 square cm. to said solution, an inert cathode positioned in said cell, electrical means for placing a voltage of about 0.6 volt across said anode and cathode, current measuring means for monitoring the current passing between said anode and cathode when said voltage is placed thereacross, and means for subjecting the surface of said silicon anode to a substantially constant source of illumination of about 25 foot-candles of light.

8. Apparatus for measuring the level of fluoride activity in a solution comprising a sample cell having opaque polyvinyl chloride plastic walls and ceiling and a transparent polymethyl methacrylate floor, a substantially light-tight housing positioned beneath said floor, said housing being closed at its top by said cell floor, an incandescent light bulb in said housing, an n-type silicon electrode mounted in the ceiling of said cell and extending thereinto to present a surface toward said bulb, and a platinum electrode mounted in the ceiling of said cell.

9. A method for measuring fluoride activity in a solution comprising establishing a series D.C. circuit having a voltage source, and a current path including said voltage source, an n-type silicon anode, said solution, and an inert cathode, delivering to said anode a constant quantity of light having a constant spectral distribution, and measuring the current developed in said circuit.

10. A method for measuring fluoride activity in a solution comprising immersing a pair of electrodes, one of which comprises an n-type silicon electrode, in said solution, directing light having a constant intensity and spectral distribution on said silicon electrode, placing a D.C. voltage across said electrodes, with the positive side of said voltage at said silicon electrode, and measuring the current passing between said electrodes.

11. A method according to claim 10 wherein the spectral distribution of said light includes light having a wave length in the visible range.

12. A method according to claim 10 and further comprising the step of mildly agitating said solution at a substantially uniform rate.

References Cited in the file of this patent

UNITED STATES PATENTS

| | | |
|---|---|---|
| 1,145,509 | Pike | July 6, 1915 |
| 2,505,936 | Behn | May 2, 1950 |
| 2,528,889 | Kohl | Nov. 7, 1950 |
| 2,927,871 | Mancke | Mar. 8, 1960 |